United States Patent
Heinrich et al.

(10) Patent No.: US 8,818,646 B2
(45) Date of Patent: Aug. 26, 2014

(54) METHOD FOR CONTROLLING AND REGULATING A MOTOR-DRIVEN ADJUSTING DEVICE

(75) Inventors: Peter Heinrich, Hinternah (DE); Mike Eichhorn, Ilmenau (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 180 days.

(21) Appl. No.: 10/344,887

(22) PCT Filed: Jul. 17, 2001

(86) PCT No.: PCT/DE01/02787
§ 371 (c)(1),
(2), (4) Date: Feb. 13, 2003

(87) PCT Pub. No.: WO02/15359
PCT Pub. Date: Feb. 21, 2002

(65) Prior Publication Data
US 2003/0171866 A1 Sep. 11, 2003

(30) Foreign Application Priority Data
Aug. 15, 2000 (DE) ................. 100 42 168

(51) Int. Cl.
*G06F 19/00* (2011.01)
*E05F 15/02* (2006.01)

(52) U.S. Cl.
USPC ................. 701/49; 318/434; 49/506; 49/349; 49/26

(58) Field of Classification Search
USPC .............. 701/49, 36; 318/445, 174, 280, 480, 318/264, 469, 266, 286, 434; 16/82, 83; 49/506, 349, 374, 375, 26; 296/216.06, 296/216.07, 216.01
See application file for complete search history.

(56) References Cited

U.S. PATENT DOCUMENTS 5,585,702 A * 12/1996 Jackson et al. ................. 318/266
5,977,732 A * 11/1999 Matsumoto .................... 318/283

(Continued)

FOREIGN PATENT DOCUMENTS

DE    40 20 351 C2    1/1992
DE    44 16 803 A1    11/1994

(Continued)

OTHER PUBLICATIONS

International Search Report of PCT/DE01/02787, dated Dec. 4, 2001.

(Continued)

*Primary Examiner* — Ronnie Mancho
(74) *Attorney, Agent, or Firm* — Christie, Parker & Hale, LLP

(57) ABSTRACT

The invention relates to a method for controlling and adjusting a motor-driven adjusting device, especially a window lifter, a seat adjusting device or a sliding roof of a motor vehicle, comprising an anti-jamming protection. The motor drive is switched off or blocked at a value below a predetermined load limit when said predetermined load limit is exceeded. The aim of the invention is to provide a method with which the adjusting device is subjected to as little loads as possible under all operating conditions. To this end, state variables of the motor drive are continuously detected and the load actually generated by the motor drive is determined from said state variables on the basis of a mathematical model of the drive.

17 Claims, 2 Drawing Sheets

(56) References Cited

U.S. PATENT DOCUMENTS

| | | | | |
|---|---|---|---|---|
| 5,979,114 | A | * | 11/1999 | Clark et al. ............... 49/360 |
| 5,994,858 | A | * | 11/1999 | Miura ............... 318/283 |
| 6,051,945 | A | * | 4/2000 | Furukawa ............... 318/280 |
| 6,150,785 | A | * | 11/2000 | Butscher et al. ............... 318/468 |
| 6,208,101 | B1 | * | 3/2001 | Seeberger et al. ............... 318/466 |
| 6,430,875 | B1 | * | 8/2002 | Clark et al. ............... 49/360 |
| 6,555,978 | B1 | * | 4/2003 | Castellon ............... 318/266 |
| 6,573,676 | B1 | * | 6/2003 | Klesing ............... 318/445 |
| 6,822,410 | B2 | * | 11/2004 | Whinnery et al. ............... 318/469 |
| 2001/0022049 | A1 | * | 9/2001 | Clark et al. ............... 49/360 |

FOREIGN PATENT DOCUMENTS

| | | |
|---|---|---|
| DE | 196 18 219 A1 | 11/1997 |
| DE | 197 45 597 A1 | 4/1999 |
| DE | 198 40 164 A1 | 3/2000 |
| DE | 199 25 372 A1 | 12/2000 |
| DE | 100 08 633 A1 | 9/2001 |

OTHER PUBLICATIONS

International Preliminary Examination Report of PCT/De01/02787, dated Nov. 26, 2002.

Examination Report of German Application No. 100 42 168.7, dated Apr. 7, 2003.

English translation of IPER, dated Nov. 26, 2002, for International Application No. PCT/DE01/02787.

* cited by examiner

METHOD FOR CONTROLLING AND REGULATING A MOTOR-DRIVEN ADJUSTING DEVICE

CROSS-REFERENCE TO RELATED APPLICATION

This application is a National Phase Patent Application of International Application Number PCT/DE01/02787, filed on Jul. 17, 2001, which claims priority of German Patent Application Number 100 42 168.7, filed Aug. 15, 2000.

The invention relates to a method for controlling and regulating a motor-driven adjusting device according to the preamble of claim 1. The method is suitable in particular for controlling a motor-driven window lifter, seat adjuster or sun-roof of a motor vehicle.

From DE 198 40 164 A a drive device and method for adjusting a vehicle part movable between two positions according to the preamble of claim 1 is known where the momentary force action on the movable vehicle part is determined from the period length of the electric motor driving the movable vehicle part, from force change values which are calculated from changes in the motor speed, and from the accumulated force change values balanced through systems of equations which were established using a mathematical model of the complete adjusting device including the drive, i.e. solely from values which depend on the behaviour of the electric motor. The momentary force action on the movable vehicle part is used as the criterion for switching off or reversing the electric motor whereby when calculating the force change values for each speed change value which exceeds an upper threshold value the value of this upper threshold value is used in place of the speed change value.

In order to restrict the number of physical variables to be detected and frequency of scanning the physical variables the period length of the revolutions of the electro-motorised drive is detected by means of a magnetic wheel and two Hall sensors and from the detected period duration in conjunction with different empirically or technically measured parameters a finely screened monitoring of the anti-jamming protection criteria is attempted through extrapolation of the detected period duration. To this end in order to determine the momentary force action on the movable vehicle part the measured values which only occur periodically are extrapolated from the period duration whereby the parameters which are used in the extrapolation formula model the overall system of the drive device and are determined through the spring stiffness, dampings and frictions of the overall system. Spectral proportions of the period time path which stem from vibrations, are evaluated weaker than those which stem from a jamming situation. From the estimated values thus determined for the period duration the speed change is then estimated at a time point, in relation to the previous time point by using a motor voltage filter and a path profile filter, in order to eliminate the effects of the motor voltage and position of the movable vehicle part on the motor speed.

The variables used for eliminating the effects of the motor voltage and position of the movable vehicle part on the motor speed simulate inter alia the dynamic behaviour of the motor in the case of voltage changes. A further correction is carried out in that the estimated speed changes are compared with a fixed time constant lower limit. As soon as the estimated speed changes exceed this lower limit they are multiplied with a proportionality factor which produces the gradient of the motor characteristic of the electric motor.

In order to eliminate these influences the atmospheric temperature is detected by a temperature sensor and the motor temperature is determined approximately throughout the detection of the operating period.

With the method known from DE 198 40 164 A the speed or period length of the electric motor coupled to the movable vehicle part is thus detected and linked with different empirically determined parameters to form a criterion for the anti-jamming protection.

From U.S. Pat. No. 5,585,702 a control device is known for an adjusting device of a motor vehicle which has two position sensors, a temperature sensor, a current sensor detecting the motor current, and a micro processor which is additionally connected to a control switch and controls the electrical connection between the adjusting motor and a voltage source in dependence on the position of the control switch and the sensor signals issued by the sensors. From the sensor signals of the current sensor and temperature sensor the micro processor calculates a temperature-compensated adjusting force of the adjusting device at predetermined closing positions of the adjusting device. By comparing the temperature-compensated adjusting force with a reference value the adjusting motor is reversed when the temperature-compensated adjusting force is greater than the reference force value.

From DE 40 20 351 C2 a method is known for controlling a window pane of a motor vehicle in which a correcting process is applied in order to derive an anti-jamming protection criterion which prevents premature response of an anti-jamming protection device. For this purpose a first sensor unit supplies a control electronics with signals originally linking with the assembly, such as on-board voltage, window lifter speed, torque of drive, weight of window pane etc, whilst a second sensor element supplies the control electronics with signals originally not linked with the assembly, namely with acceleration forces which act on the vehicle body. In order to prevent a false switch-off or reversal the signals of the second sensor element are used as the basic level and the signals of the first sensor unit are evaluated from safety aspects.

The methods known from the prior art thus apply a fine screening during speed detection or detecting speed changes as well as filter functions for limiting or focusing an anti-jamming protection criterion in order to thus reduce the risk of faulty triggering of the anti-jamming protection.

Based on this prior art the object of the invention is to provide a method for controlling and regulating a motor-driven adjusting device of the type mentioned above which under all operating conditions ensures the smallest possible load on the adjusting device as well as the individual components or structural parts of the adjusting device even when taking into account anti-jamming processes or a proposed anti-jamming protection.

This is achieved according to the invention through a method having the features of claim 1.

The links between the relevant components of the adjusting system are taken into account by detecting the relevant input variables of the adjusting device by means of the mathematical model of the adjusting device so that a very accurate calculation of the load of the adjusting device or motorised drive and thus also the jamming force becomes possible. By the term "adjusting device" are meant all the components of an adjusting system which are required for operating an adjusting device, for example the window pane as a component part to be adjusted, the pane guides, the guide rails, sealing elements, the electromotorized drive and the assembly for forwarding the drive force.

The input variables of the adjusting system are produced inter alia from the changing environmental conditions such as temperature, dampness or pressure, whose change for the operating of the adjusting device entails a corresponding change in the adjusting force which is to be applied. The adjusting force which is to be applied is used to determine the jamming force which can be tolerated at each time point so that a reaction is possible with great precision when a jamming situation exists and the drive is to be stopped or reversed.

All the different physical input values which are relevant for an anti jamming protection criterion or for the load of the overall system and which are measured or calculated are each evaluated in a static or dynamic system of equations allotted to the input variables and converted into a force component representing the momentary input variable in relation to the overall system so that all the force components determined parallel to each other can flow into one total force. The total force can be compared with a maximum permissible jamming force or a maximum load force.

By calculating the jamming force by means of the mathematical model of the adjusting device it is thereby possible to take into account even input variables which hitherto were not detectable by sensors or could only be determined at great expense and had to be included into the conventional control of the adjusting device. Thus all the input variables of the system detected in the model can be taken into account and where necessary can be evaluated as regards the intensity of their action on the overall system. The actual, thus continuous or frequent, determination of the input variables ensures that the maximum permissible jamming force can be predetermined with a high precision whereby a faulty triggering of the anti-jamming protection and overloading of the drive or of the adjusting device is avoided.

This has the result that a very precise layout of the relevant components, for example the gear elements, stops or sockets for the adjusting device on the vehicle body can be achieved, whereby overall an easier cost-effective method of construction can be obtained.

A simple type and method of calculating the force generated by the motorised drive consists in determining this on the basis of the speed and terminal voltage of the electromotorized drive since these variables can be determined simply and accurately.

Furthermore the parameters of the mathematical model can be determined at least in part on the basis of the input variables actually detected or the time-dependent paths of the input variables. In this way it is ensured that the real conditions under which the drive motor operates, are detected and used as the basis of the calculation. As an alternative to the actual detection of the data the paths of the input variables measured or calculated once can be determined over a predetermined time period and used as a basis for the calculation. By way of example temperature increases during a longer operating period or the ageing of the seals and wear and tear and the changes in the friction condition resulting therefrom can be taken into account.

In a further variant it is proposed that at least a part of the parameters of the mathematical model is fixed on the basis of empirically determined data. In this way the calculation expense is reduced if parameters which are not or only negligibly changing are determined and established as a result of a test measurement. Such a test measurement is for example to be undertaken in the case of electric motors which do indeed have a certain manufacturing variance but which over their operating period show fewer changes in their operating behaviour.

Furthermore it is proposed that in addition the temperature is processed as an influencing factor on at least one of the parameters of the mathematical model since the temperature can change within a relatively wide range and can have a great effect on the friction behaviour of the relevant individual components.

In order to establish the load limit it is expedient to use empirically determined data or theoretical load calculations as far as the mechanical components of the drive are concerned in order to obtain the most accurate information possible regarding the mechanical strengths and load capacity of the relevant parts. In the case of empirical data it is possible to use and evaluate experiments which were undertaken within the scope of designing and approving the adjusting device. The theoretical load calculations which exist when designing components or as recorded data in CAD drawings can thus simply be adopted into the mathematical model of the drive.

Since the temperature is a value which is easy to determine and which moreover permits multiple conclusions to be drawn regarding the operating conditions and in particular the friction conditions the load limit can be determined in dependence on the temperature of at least a part of the adjusting device.

So that the motor performance can be best adapted to the operating conditions it is proposed that the load limit is determined anew for each adjusting process. This safeguards that overloading occurs of the drive or the adjusting device as a result of a load limit which had been determined previously but which is no longer up to date.

In order to increase the precision of the method the load limit can be determined continuously during the adjusting process. In this way it is possible to react to changes which occur during the adjusting process.

In addition or as an alternative the temperature of at least one part of the adjusting device can be measured in order to obtain information on the actual state of the adjusting device. As an alternative it is proposed that a temperature measured at one place with comparable conditions is established as the temperature of an adjusting part. In this way it is not necessary to determine the temperature of all the parts or of one part of the components of the adjusting device since the temperature and the behaviour of the entire component part or components can be concluded from the measured temperature at the one spot.

The method according to the invention takes into account when establishing the load limit also the amount of mean variation in the actual load calculated through the mathematical model. Since when calculating the load limit however it is always necessary to take into account some inaccuracy in the measurement, variance in the production accuracy of the individual components and the mean variation which is basically to be expected, the actual load calculated is liable to contain some inaccuracy. This inaccuracy which can deviate both positively and negatively from the calculated value is for safety reasons correspondingly taken into account as an absolute amount and added to the calculated load so that there is a safeguard against too little drive power.

In addition to the static parts of the mathematical model in one embodiment it is proposed that the mathematical model has a dynamic proportion which takes into account the effects of accelerating and braking of the adjusting device or motorised drive. If for example an adjusting movement is initiated, as a result of the adhesive friction and inertia forces of the components which are to be adjusted it can result in a temporary increase in the adjusting force to be applied whereby with a very sensitively set anti-jamming protection device a false reversing movement can be introduced. By correspondingly taking into account the dynamic proportion in the mathematical model a more reliable accurate operation of the adjusting device is guaranteed.

Furthermore it is proposed that the mathematical model of the motorised drive has a proportion which is characterised by the structural and physical factors, thus for example the properties of the drive motor, the arrangement of the assemblies which are to be adjusted, the friction conditions and degrees of efficiency of the gearing and the like.

In a further embodiment of the invention it is proposed that the mathematical model has a proportion which represents the actual characteristic field of the motorised drive which is used. A motor model is thereby set up which incorporates the corresponding measured values of the drive motor used each time. Thus for each drive motor or each motor type an actual characteristic field is determined which is added to the mathematical model of the adjusting device. Taking into account the actual characteristic fields of the motors is advantageous since in part considerable variances occur during manufacture and by considering the actual performance capacity of the drive motors in the relevant speed range it is possible to avoid over-dimensioning which would otherwise be necessary.

Further advantages of the invention are explained in the following detailed description of an embodiment with reference to the drawings in which.

Figure 1:
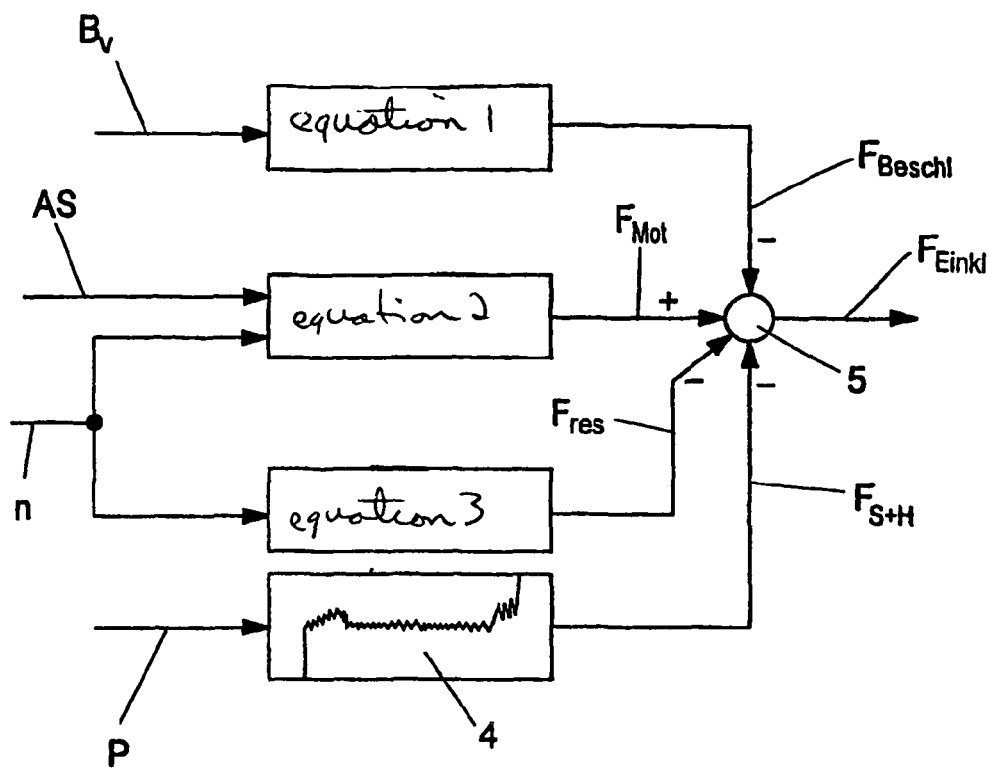
FIG. 1 shows a diagrammatic view for determining the load values of an adjusting device.

FIG. 1 shows a diagrammatic view for determining the load on an adjusting device in which a jamming force $F_{eink1}$ is determined as the resulting variable. Initially input or state variables are thereby generated, whether through measurements or through calculations, and these input or state variables are each supplied to a dynamic system of equations 1 to 3. In the dynamic system of equations 1 to 3 which were set up from a mathematical model of the adjusting device including the drive, the force components are calculated which help to increase or reduce the overall load on the adjusting device or individual components of the adjusting system.

The individual force components are combined and produce the target variable, in the present case the maximum jamming force $F_{eink1}$ permissible. If this jamming force $F_{eink1}$ is reached then the drive is switched off or reversed so that on the one hand only a predetermined load can be exerted on the adjusting device and on the other hand limbs or objects cannot be nipped or cut off by the adjusting device. The method will now be explained in relation to a window lifter and the diagrammatic illustration provided in FIG. 1.

In order to calculate the force components, as input variables are provided according to FIG. 1 the vertical acceleration $B_v$ of the device to be adjusted, thus for example a window pane and the remaining movable component parts of the window lifter, the control signal AS of the motor, the motor speed n as well as the position P of the device which is to be adjusted (window pane).

From the vertical acceleration $B_v$ of the window pane and taking into account the mass which is to be displaced by means of a first dynamic system of equations 1 the acceleration force $F_{Besch1}$ is determined which is entered with a negative sign into the force balance formed at a comparison point 5. As vertical acceleration force $B_v$ is thereby to be regarded in particular that force component which acts on the adjusting device when driving over a bad stretch of road. The vertical acceleration forces which appear when driving over such a roadway and which act on the vehicle body could lead to a false designation of the overall load or overall force.

A time delay when determining the vertical acceleration force $B_v$ can arise through the installation position of the recording sensor and through a spring action as a result of an elastic component with the mechanical construction of the connection of the window pane with the gear elements. This delay in detection is taken into consideration accordingly.

The motor force component $F_{mot}$ is calculated from the dimension-less value of the control signal AS of the drive motor which is provided for example as a pulse-width-modulated signal, as well as the rotational speed n of the motor. When calculating the motor force component $F_{mot}$ by means of a second dynamic system of equations 2 the motor constants are taken into consideration which take into account the inductance of the rotor and the resistance of the rotor as well as the geometric conditions of the drive and the motor torque. The motor force component $F_{mot}$ is entered with positive sign into the force balance since it supplies an added assistance for moving the window pane.

Likewise from the rotational speed n is determined the resulting force $F_{res}$ through a third dynamic system of equations 3 formed as a high-pass filter which takes into account a mechanical time constant and a slide friction constant whereby friction effects in the case of the slide friction and mass inertia forces are included in the consideration. The resulting force $F_{res}$ is entered with negative sign into the force comparison at the comparison point 5 since it does not provide any assistance to the movement of the window pane.

Finally the position-dependent adhesive friction force component $F_{S+H}$ is entered with negative sign into the force comparison which is determined through a reference drive. The adhesive friction force component $F_{S+H}$ is dependent on the position P of the window pane since different adhesive friction conditions prevail at different places, and its path is recorded in a Table 4 on the basis of a reference drive. Likewise the weight of the pane is taken into account in this component as a constant factor or parameter.

A total force is calculated from the individual force components whereby in the example of the window pane that force is determined which has to act on the system of the adjusting device in order to close the window pane up tight and secure, or that force which may only be applied maximum onto an object or body part in the event of nipping. This force is hereinafter designated jamming force $F_{eink1}$.

The method is thus based on the determination of the total force on the basis of a balance of the individual force components. Consequently all system-conditioned and external factors are included in the calculation of the overall force whereby a very precise determination of the required or permissible force and thus total load on the adjusting device becomes possible. If this calculated force is exceeded which can be detected through various sensors, the drive is switched off or reversed, depending on the field of use or rotary direction of the adjusting device. In the case of a window lifter during a closing movement a reverse action is advisable and during an opening movement a complete stop is better since in the first case a nipping situation is more likely and in the second case overloading or running into an end stop is more likely.

If when calculating the load on the adjusting device an additional mass is to be taken into account, for example the mass of a passenger on a vehicle seat, then this is likewise to be multiplied with the gravitational acceleration and included as a negative into the balance.

More particularly as a result of temperature fluctuations or ageing processes the parameters of the mathematical model on the basis of which the relevant force components are calculated can change. These parameters are either balanced in the course of using the adjusting device, or the ageing and temperature changes as a result of the period of use of the adjusting device, thus both the overall period of use as regards ageing and the current period of use of the adjusting device are estimated or retrieved from the stored measured values.

Figure 2:
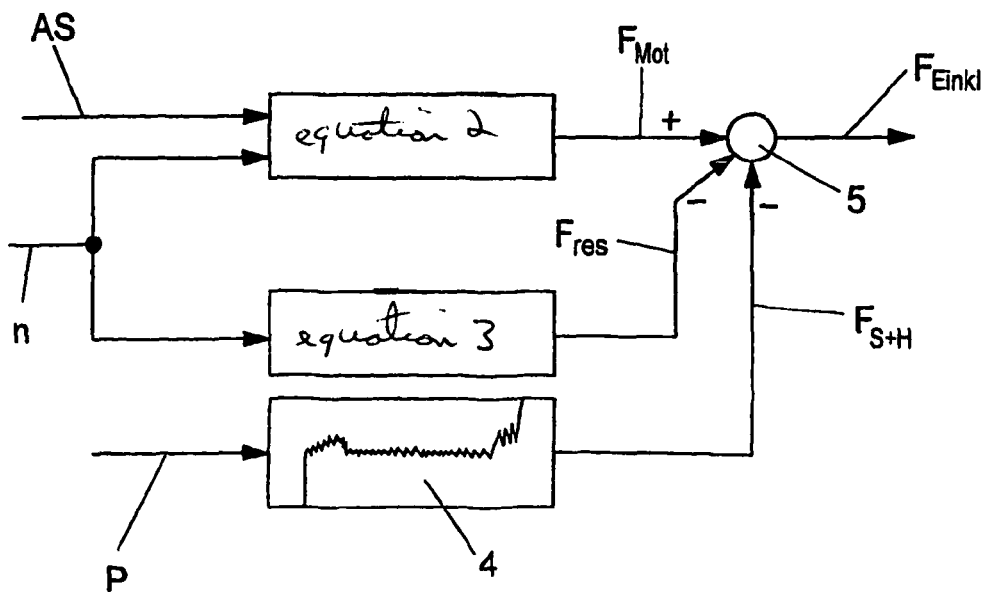
FIG. 2 shows a diagrammatic view according to FIG. 1 without taking into account the vertical acceleration.

FIG. 2 shows a simplification of the method in which the determination of the jamming force $F_{eink1}$ is carried out substantially as described above with reference to FIG. 1. However this calculation model dispenses with detecting the vertical acceleration Bv when driving over a poor stretch of road and thus the first dynamic system of equations 1 and the acceleration force $F_{Besch1}$ resulting therefrom.

Figure 3:
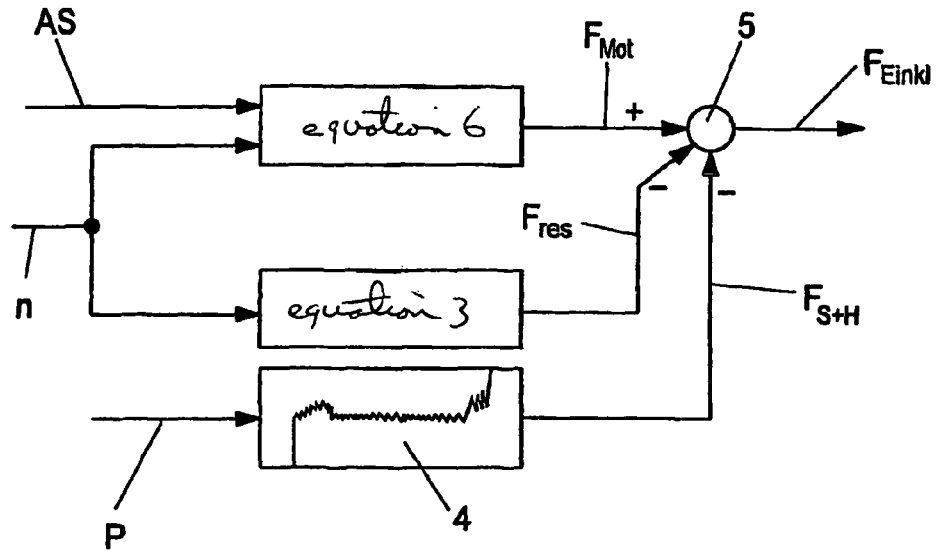
FIG. 3 shows a diagrammatic view according to FIG. 2 taking into account the static instead of the dynamic properties of the drive motor.

A further simplification of the mathematical model exists in FIG. 3 in disregarding the dynamic properties of the drive motor and instead replacing the dynamic system of equations 2 for calculating the motor force $F_{mot}$ in which variable parameters are present, by a static system of equations 6. Such a system can then be adopted if dynamic values such as e.g. the induction voltage are negligible. The static equation system 6 is loaded with the input variables speed n and control signal AS and the motor force $F_{mot}$ is calculated from this.

A static equation system of this kind can then be used advisably for example if the electric time constant is very small compared with the mechanical time constant. The electric time constant is produced from the quotient of the inductance in respect of the resistance and the mechanical time constant from the quotient of the sum of the inertia moments in respect of the geometry of the drive.

Figure 4:
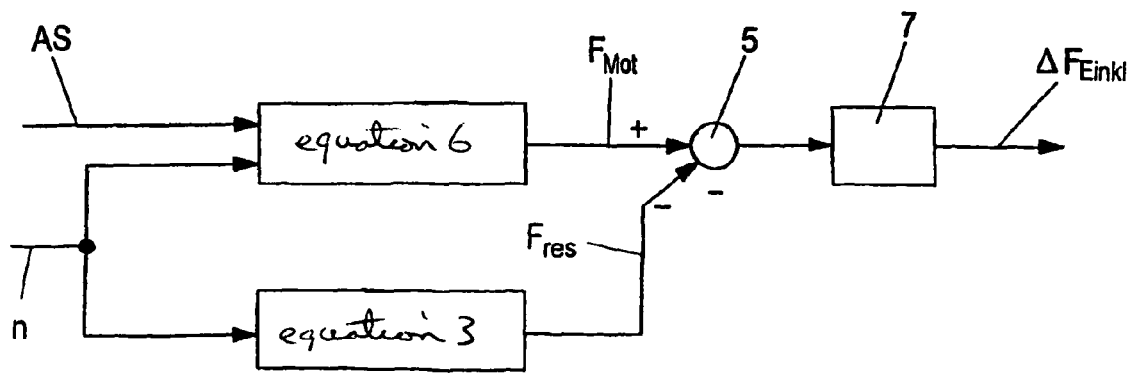
FIG. 4 shows a diagrammatic view according to FIG. 3 without taking into account structurally conditioned slow actions of components of the adjusting device.

FIG. 4 shows a markedly simplified mathematical model in which the determination of the jamming force $F_{Eink1}$ or the maximum permissible load on the adjusting device is carried out without knowledge of the structural slow actions, vertical acceleration, disregard of the dynamic properties of the drive motor and where necessary the weight of a user of the adjusting device.

The structural slow actions arise for example from the friction of the seals, material matching or tensions which exist through the assembly or as a result of the construction inside the adjusting device. In this case the maximum slow action to be expected is assumed to be as with the mathematical model of FIG. 3. Detecting the position P of the device which is to be adjusted is omitted and instead the force calculated from the motor force $F_{Mot}$ and the resulting force $F_{res}$ is directed through a high pass filter 7 and the value $F_{Eink1}$ is issued whereby the advantage of the simplification of the calculation of the value is accompanied by a reduction in the resolution and accuracy.

All the methods described above have in common that as the target value a maximum permissible load is calculated which is compared with the total force of the adjusting device. The permissible load is determined through a force balance on the basis of a mathematical model of the adjusting device whereby in the model all essential influencing factors of the different areas exist as parameters. These parameters are either calculated, measured or detected autoadaptively.

The modular structure makes it possible for the method to be used in various different areas and on different adjusting devices, depending on the type of adjustment, the possibilities for detecting the parameters and the evaluation of existing test data.

The invention claimed is:

1. A method for controlling and regulating an adjusting device of a motor vehicle having an anti-jamming protection, the adjusting device being driven by a motorized drive, comprising:
    substantially continuously detecting input variables of the adjusting device;
    calculating a maximum permissible jamming force of the adjusting device as a function of the input variables;
    comparing a total force of the adjusting device to the maximum permissible jamming force; and
    if the total force exceeds the maximum permissible jamming force, switching off the motorized drive or regulating the motorized drive of the adjusting device;
    wherein the calculating of the maximum permissible jamming force of the adjusting device comprises:
        determining an individual force component as a function of corresponding input variables, each individual force component contributing to increasing or reducing the maximum possible jamming force of the adjusting device; and
        computing the maximum permissible jamming force of the adjusting device by a summation of the individual force components by entering each individual force component into a summation member with a positive sign or a negative sign depending on whether the individual force component assists or counteracts, respectively, the adjusting movement of the adjusting device.

2. The method according to claim 1, wherein the calculating of the maximum permissible jamming force includes:
    determining a first force component as a first dynamic function of a rotational speed of an electric motor of said motorized drive, the first dynamic function representing a high pass filter taking into account a mechanical time constant and slide friction constant;
    determining a second force component as a static function of the rotational speed of said electric motor and a control signal of the electric motor; and
    supplying the first force component to the summation member with a negative sign, and the second force component to the summation member with a positive sign.

3. The method according to claim 2, wherein the calculating of the maximum permissible jamming force includes connecting the summation member to a high pass filter, the high pass filter issuing the maximum permissible jamming force.

4. The method according to claim 2, wherein the calculating of the maximum permissible jamming force includes:
    determining a position-dependent adhesive friction force component as a third dynamic function of a position of a part to be adjusted by the adjusting device the third dynamic function including a table function; and
    supplying said adhesive friction force component to the summation member with a negative sign, the summation member issuing the maximum permissible jamming force.

5. The method according to claim 1, wherein the calculating of the maximum permissible jamming force comprises:
    determining a first force component as a first dynamic function of a rotational speed of an electric motor of said motorized drive the first dynamic function representing a high pass filter taking into account a mechanical time constant and slide friction constant;
    determining a second force component as a second dynamic function of the rotational speed of said electric motor and a control signal of the electric motor;

supplying the first force component to the summation member with a negative sign, and the second force component to the summation member with a positive sign; and determining a position-dependent adhesive friction force component as a third dynamic function of a position of a part to be adjusted by the adjusting device, the third dynamic function including a table function;

supplying said adhesive friction force component to the summation member with a negative sign, the summation member issuing the overall force.

6. The method according to claim 5, wherein the calculating of the maximum permissible jamming force comprises:
determining an acceleration force component as a fourth dynamic function of a vertical acceleration of the part to be adjusted, said fourth dynamic function taking into account the mass of the part to be adjusted, and issuing the acceleration force component with negative sign to the summation member.

7. The method according to claim 1, wherein the calculating of the maximum permissible jamming force comprises:
determining the maximum permissible jamming force of the adjusting device or motorized drive as a function of the actual detection of said input variables or the time-dependent variation of said input variables.

8. The method according to claim 1, wherein the calculating of the maximum permissible jamming force comprises:
taking into account, for the calculating of the overall maximum permissible jamming force of the adjusting device or the motorized drive, empirically determined data representing parameters correlated to the adjusting device or the motorized drive.

9. The method according to claim 1, wherein the calculating of the maximum permissible jamming force comprises:
using empirically determined data or theoretical force calculations regarding mechanical components of the motorized drive for the establishing of the maximum permissible jamming force.

10. The method according claim 1, wherein the calculating of the maximum permissible jamming force comprises:
determining the force limit in dependence on the temperature of at least one part of the adjusting device.

11. The method according to claim 10, wherein the calculating of the maximum permissible jamming force comprises:
determining the maximum permissible jamming force anew for each adjusting process.

12. The method according to claim 10, wherein said calculating of the maximum permissible jamming force takes place substantially continuously.

13. The method according to claim 1, wherein said calculating of the maximum permissible jamming force comprises taking into account a mean variation of the maximum permissible jamming force that is actually generated by the motorized drive and calculated as a function of the input variables.

14. The method according to claim 1, wherein the calculating of the maximum permissible jamming force as a function of the input variables includes taking into account dynamic influences during acceleration and braking of the motorized drive.

15. The method according to claim 1, wherein the calculating of the maximum permissible jamming force comprises taking into account characteristic curves of the motorized drive.

16. The method according to claim 1, wherein said adjusting device is window lifter, seat adjuster and sun-roof.

17. A method for controlling and regulating an adjusting device of a motor vehicle having an anti jamming protection, the adjusting device being driven by a motorized drive, comprising:

substantially continuously detecting input variables of the adjusting device;

calculating a maximum permissible jamming force of the adjusting device or motorized drive as a function of the input variables;

comparing a total force of the adjusting device to the maximum permissible jamming force; and if the total force exceeds the maximum permissible jamming force, switching off the motorized drive or regulating the motorized drive of the adjusting device;

wherein the calculating of the maximum permissible jamming force of the adjusting device comprises:

determining a first force component as a first dynamic function of a rotational speed of an electric motor of said motorized drive, the first dynamic function representing a high pass filter taking into account a mechanical time constant and slide friction constant and determining a second force component as a static function of the rotational speed of said electric motor and a control signal of the electric motor; and computing the maximum permissible jamming force of the adjusting device by supplying the first force component to the summation member with a negative sign and the second force component to the summation member with a positive sign.

* * * * *